S. BECKNER.
Harrow.
No. 206,922. Patented Aug. 13, 1878.
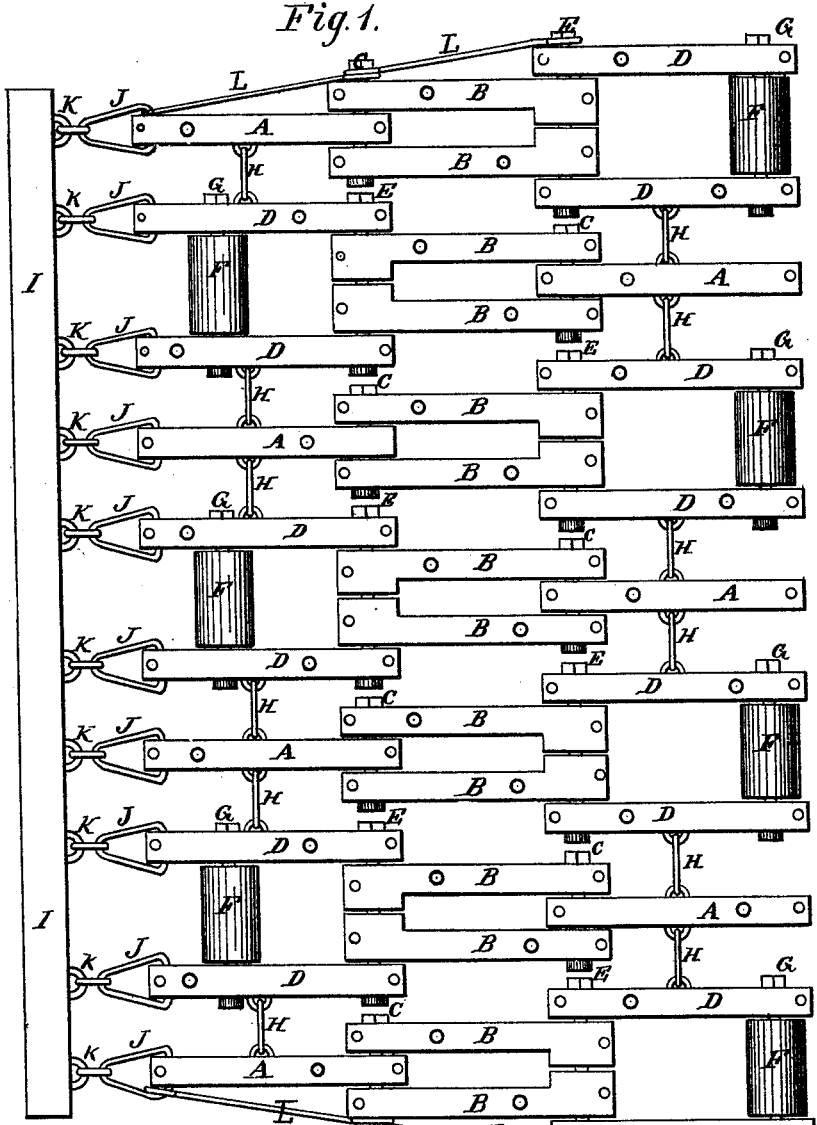
WITNESSES:
Henry N. Miller
C. Sedgwick
INVENTOR:
S. Beckner
BY Munn & Co.
ATTORNEYS.

UNITED STATES PATENT OFFICE.

SAMUEL BECKNER, OF ARGOS, INDIANA.

IMPROVEMENT IN HARROWS.

Specification forming part of Letters Patent No. 206,922, dated August 13, 1878; application filed July 6, 1878.

*To all whom it may concern:*

Be it known that I, SAMUEL BECKNER, of Argos, in the county of Marshall and State of Indiana, have invented a new and useful Improvement in Harrows, of which the following is a specification:

Figure 1 is a top view of my improved harrow. Fig. 2 is a side view of the same.

Similar letters of reference indicate corresponding parts.

The object of this invention is to furnish improved harrows, simple in construction, inexpensive in manufacture, and effective in operation, being so constructed as to adjust themselves to the surface of the ground, harrowing ridges and furrows with the same facility and effectiveness as level ground.

The invention will first be described in connection with the drawing, and then pointed out in the claim.

The harrow-frame is made in sections, each section being formed of five bars and a roller, connected together by bolts.

One end of each section is formed of a bar, A, to the opposite sides of one end of which are hinged the ends of two bars, B, by a bolt, C, passing through the overlapped ends of the three bars A B B. The other ends of the bars B B are thickened upon their inner sides, so that the said bars may be parallel, and to their outer sides are hinged the ends of two bars, D, by a bolt, E, which passes through the overlapped ends of the four bars B B D D. To and between the other ends of the two bars D D is pivoted a roller, F, by a bolt, G, as shown in Figs. 1 and 2.

The flexible V-shaped sections are placed side by side with their narrow and wide ends alternating with each other, as shown in Fig. 1. The sections are flexibly connected together at the middle parts of the bars A and D by links and staples H, as shown in Fig. 1.

The forward ends of the bars A and D of the sections are connected with the long draw-bar I by clevises J and links and staples K, or other flexible connections.

The harrow may be made of any desired width by increasing or diminishing the number of sections used.

With this construction the harrow will adjust itself to the surface of the ground, however uneven it may be, harrowing ridges, furrows, and level ground with the same facility and thoroughness, and leaving the surface of the ground smooth.

To the outer sides of the side sections are attached guard-rods L, which extend from the forward ends of the bars A to the forward ends of the bars B and from the forward ends of the bars B to the forward ends of the bars D, as shown in Fig. 1, so that there may be no square shoulders at the sides of the harrow to strike against trees, stumps, posts, stakes, and other obstructions.

Having thus described my invention, I claim as new and desire to secure by Letters Patent—

The combination, in a harrow, of the long bar I and the connections J K L with the pivoted bars A B D, connected by rollers F and rods H, as shown and described.

SAMUEL BECKNER.

Witnesses:
ENOCH W. HESS,
FELIX HESS.